United States Patent
Brun et al.

(10) Patent No.: US 7,347,595 B2
(45) Date of Patent: Mar. 25, 2008

(54) METHOD OF PROVIDING MODULATED ILLUMINATION OF A ROAD, AND A VEHICLE HEADLIGHT FOR PERFORMING THE SAID METHOD

(75) Inventors: Norbert Brun, Bobigny Cedex (FR); Pierre Albou, Bobigny Cedex (FR); Antoine De Lamberterie, Bobigny Cedex (FR); Joël Leleve, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/477,463

(22) Filed: Jun. 30, 2006
(Under 37 CFR 1.47)

(65) Prior Publication Data

US 2006/0245199 A1     Nov. 2, 2006

Related U.S. Application Data

(63) Continuation of application No. 10/766,988, filed on Jan. 28, 2004, now abandoned.

(30) Foreign Application Priority Data

Jan. 30, 2003     (FR)     ................... 03 01083

(51) Int. Cl.
*B60Q 1/08*     (2006.01)
(52) U.S. Cl. ...................... 362/464; 362/561; 362/303; 362/459; 362/466; 362/467; 340/435

(58) Field of Classification Search ................ 362/464, 362/561, 268, 303, 459, 466, 467, 513; 340/435, 340/148
See application file for complete search history.

(56) References Cited

U.S. PATENT DOCUMENTS

| 4,985,816 | A | 1/1991 | Seko et al. |
| 5,161,875 | A | 11/1992 | Sekiguchi et al. |
| 5,289,352 | A | 2/1994 | Remus et al. |
| 5,681,103 | A | 10/1997 | Remillard et al. |
| 5,844,773 | A | 12/1998 | Malhi |
| 5,938,319 | A | 8/1999 | Hege |
| 6,281,806 | B1 | 8/2001 | Smith et al. |
| 6,491,416 | B1 | 12/2002 | Strazzanti |

FOREIGN PATENT DOCUMENTS

| DE | 4036199 | 5/1991 |
| DE | 19926835 A1 | 12/1999 |
| JP | 04081337 | 3/1992 |

OTHER PUBLICATIONS

French Search Report Sep. 19, 2003.

*Primary Examiner*—Jacob Y. Choi
(74) *Attorney, Agent, or Firm*—Morgan & Finnegan LLP (57) ABSTRACT

The invention relates to a method of lighting a road with a vehicle headlight, in which the projected light is modulated in response to the presence of any persons on the road. The method comprises the following operations: detecting in the road scene at least one person, pinpointing the location of the person in the road scene, creating on an imager a mask having dimensions and position corresponding to the person, and lighting the road through the imager, to create a projected shadow around the person.

The invention also provides a headlight for performing this method and having a first light source towards the imager, and an electronic system for generating light-occulting masks on the imager.

21 Claims, 4 Drawing Sheets

METHOD OF PROVIDING MODULATED ILLUMINATION OF A ROAD, AND A VEHICLE HEADLIGHT FOR PERFORMING THE SAID METHOD

This is a continuation of U.S. application Ser. No. 10/766,988, filed Jan. 28, 2004 now abandoned, and entitled, "A METHOD OF PROVIDING MODULATED ILLUMINATION OF A ROAD, AND A VEHICLE HEADLIGHT FOR PERFORMING THE SAID METHOD". The disclosure of co-pending U.S. application Ser. No. 10/766,988 is hereby incorporated herein by reference in its entirety.

FIELD OF THE INVENTION

This invention relates to a method of lighting a road, in which the light projected is modulated according to the presence of one or more living beings in the road scene which appears ahead of the vehicle. The invention also relates to a vehicle headlight for performing the said lighting method.

The invention is applicable in the field of vehicles travelling on roads, such as, for example, motor vehicles or heavy goods vehicles. In particular, it is applicable in the field of projection of light by such vehicles.

STATE OF THE ART

In view of the great number of vehicles travelling on the roads, it is necessary to obtain, for these vehicles and their drivers, lighting which is adapted in the best possible way to reduce the risks of accidents. In particular, at night it is important that the driver should be able to have optimum vision of the road that extends in front of him, as well as the areas to either side of the road. In other words, for safety reasons it is desirable to improve lighting of the road ahead of the vehicle, and therefore to improve the vision of the road scene by the driver of the vehicle.

At the present time, all vehicles travelling on the road have a means for lighting the road which is used in particular at night or in bad weather. There exist conventionally on motor vehicles two types of lighting:

so-called main beam or cruising lighting, which illuminates the road comprehensively over a long distance, of about 200 metres, which is considered as being infinity for the driver, and so-called dipped beam or passing lighting, which illuminates the road over a short distance of the order of 60 metres, so as to avoid dazzling of people who may be situated on the road or in roadside areas.

Main beam lighting is obtained by means of main beam headlights each of which delivers a light beam which is directed towards the horizon.

Passing or dipped beam lighting is obtained by means of passing headlights, also called dipped headlights, each of which directs a sheet of light downwards so as to give visibility over a distance of the order of 60 to 80 metres. This patch of descending light has the object of avoiding dazzling of anybody, on foot or in a vehicle travelling in the opposite direction, who may be within the road scene which extends ahead of the is vehicle. However, such a patch of downwardly directed light offers only reduced visibility to the driver of the vehicle ahead of the vehicle. This lighting is often insufficient to enable the driver to have good visibility of the whole of the road scene in order that he is able to anticipate any bends or any possible obstacles.

On the other hand, main beam lighting enables the road ahead of the vehicle to be lit as far as the horizon. For this purpose, main beam lighting delivers a light beam which is directed towards the horizon, that is to say it extends straight in front of the vehicle, and this does not fail to dazzle those people who are on the road or on the roadside areas, because they receive the light head-on.

At the present time, there is no known device which enables the road to be lit to infinity or over a long distance without dazzling people who are on the road.

However, there does exist a headlight which enables the main lighting beam of the vehicle to be modulated on the road. Such a headlight is described in patent applications DE 199 07943 and U.S. Pat. No. 5,938,319. This headlight enables there to be projected on the road a light indication such as an arrow, in order to indicate for example the direction that the driver must follow. This indication is then lit while the zone that surrounds it is dark, that is to say it is unlit. Such a light indication is produced by means of a headlight which includes a plurality of micromirrors having dimensions of the order of one tenth or one hundredth of a millimetre. In other words, the headlight enables the light projected on the road to be modulated. However, it only permits modulation of the light over part of the main beam. It does not permit control of the modulation of the whole of the light beam emitted by a conventional main beam lighting system.

In addition, such a headlight is very expensive to manufacture, its cost being of the order of one half of the price of the whole vehicle. It is therefore difficult to envisage that such headlights would be fitted on mass-produced motor vehicles, for which the manufacturers are constantly seeking to reduce manufacturing costs.

Another motor car headlight with light modulation is described in patent application EP 0 266 908. This headlight with modulated light has the object of enabling dipped beam or main beam lighting to be obtained with only a single light source. To this end, it includes, between a reflector and a single light source, an occulting screen which is interposed in the path of the light rays and which includes occulting zones consisting of liquid crystals, which are adapted to confer on these zones several states of transparency. Thus where lighting is in the main beam mode, the occulting screen is totally transparent, enabling the whole of the light beam to be projected on the road. In the passing beam mode, the occulting screen is partly occulting, thereby enabling only a part of the light beam emitted by the light source to be projected, and in particular the part which is situated below a line of the illumination pattern which is called the "cut-off line" and which is defined by a regulation. This cut-off line is a line defining an upper limit of the lighting, above which it is forbidden to transmit light in the passing or dipped beam mode. In countries where they drive on the right, it is horizontal over the whole width of the road and on the roadside area to the left of the road, and it defines an angle of 15. degree. above the horizontal on the right hand roadside area.

However, in practice such a headlight cannot be achieved. In this connection, a liquid crystal occulting screen such as that described in the said patent application is very sensitive to received energy, and in particular to the temperature to which it is subjected. Thus, a liquid crystal occulting screen subjected to energy which is too powerful is necessarily faulty. Now, the light source used for main beam lighting is a powerful light source, too powerful for a liquid crystal occulting screen to be able to resist it physically.

DISCUSSION OF THE INVENTION

More precisely, an object of the invention is to provide a remedy for the drawbacks of the techniques discussed above. To this end it proposes a headlight for a vehicle, for dipped or passing beam illumination, in which the light is modulated in response to the presence of any persons who may be on the road. The invention also proposes a method of lighting which is performed by such a headlight. The said lighting method has the object of detecting persons and other living beings who are in the road scene, to create a screen which corresponds to those persons both in dimension and in position, and to illuminate the road with this screen in such a way that a projected shadow is created all around the person. The person is thus within the shadow of the screen, so that the shadow covers the whole of the person, and possibly somewhat more: the shadow may have the shape and/or contours of the person, or it may extend slightly beyond the outline of the person for greater safety.

More precisely, the invention provides a method of lighting a road scene with a vehicle headlight, characterised in that it includes the following operations:

detecting in the road scene at least one person, pinpointing the location of this person in the road scene, creating, on an imager, a mask having dimensions and position corresponding to the person, and illuminating the road through the imager, so creating a projected shadow around the person.

Preferably, the method is applied to a zone of the road scene situated above a cut-off line.

The invention also provides a headlight which performs this method. This main beam headlight for a vehicle, comprises a first light source and a system for modulating the light therefrom, and is characterised by the fact that the modulating system comprises an imager, a light guide for transporting the light from the light source to the imager, and an electronic system for generating masks on the imager for blocking light.

The invention proposes two variants, which are however not limiting as regards choice of the imager: the imager may comprise a matrix or a set of electrically controllable liquid crystal systems. It may also comprise a matrix or set of lenses, the focal length of which is capable of being modulated by electrical control. This type of lens is described in particular in patent application EP 1 019 758, and its operation is based on the phenomenon of electro-wetting. Generally, each of these lenses comprises a chamber filled with a first liquid, a drop of a second liquid being disposed on a zone of a first face of an insulating wall of the chamber, the two liquids being non-miscible and having different optical indices and similar densities. The first liquid is conductive, the second insulating, and means are employed to apply an electrical voltage between the conductive liquid and an electrode which is disposed on the second face of the said wall. Reference should be made to the above mentioned patent for more details. Within the scope of the present invention, the focal length is adjusted by applying the appropriate voltage for the lens to allow all or part of the light to pass, or no light at all.

This electrically controllable type of lens may preferably be used in a matrix or by itself in numerous applications in headlights or indicating lights for motor vehicles.

The headlight according to the invention is preferably associated with a camera, for example a thermal camera, which controls the electronic system.

DETAILED DESCRIPTION OF EMBODIMENTS OF THE INVENTION

The invention proposes a method for illuminating a road scene, as a complementary addition to conventional main beam or cruising lighting. This method offers an extent of lighting which is greater than for the usual cruising type lighting, without any risk of dazzling people situated on the road or on roadside areas.

To this end, the method of the invention proposes to illuminate the road above the cut-off line by generating a projected shadow around the person or persons who happen to be in the said zone. This projected shadow is generated by forming, for example on a liquid crystal imager, a mask corresponding to the position and dimension of the person, and covering a zone of the imager such that a part of the light beam emitted by a light source does not pass through the imager and is not projected on the road. The mask thus created enables a projected shadow to be formed around the person while the road scene is being illuminated beyond the cut-off line. The projected shadow corresponds to the silhouette of the person. It may correspond exactly to their silhouette, or it may include a zone surrounding their silhouette. In the present case, the use of a liquid crystal imager is possible without any danger of premature deterioration of the liquid crystals, because the optical system employed is preferably not an elliptical module. It is effectively in elliptical modules that the danger of heating is greatest, because it needs a lens which creates a point of convergence of the rays reflected by the reflector, thereby producing a hot point within the headlight.

Figure 1:
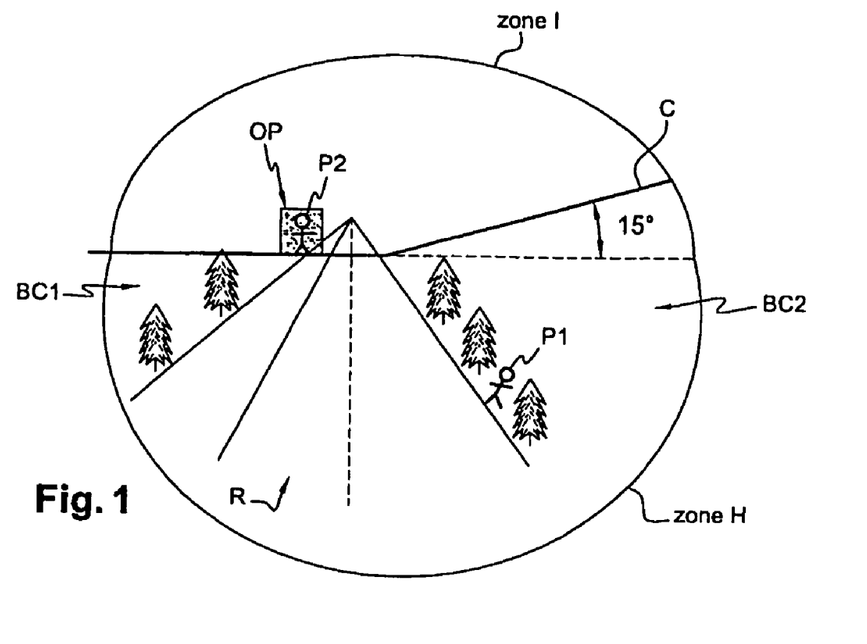
FIG. 1 shows diagrammatically a road illuminated by conventional cruising lighting combined with lighting according to the invention.

FIG. 1 shows one example of a road scene. In this example, the road is referenced R. It has a left-hand roadside area BC1 and a right-hand roadside area BC2. A first person P1 is on the right-hand area beside the road. He is situated in the zone of usual illumination by a main beam, namely zone H, that is to say the zone of illumination situated below the cut-off line C. He is not dazzled by the main beam lighting emitted by the headlights of the vehicle. A second person P2 is situated in the zone of illumination above the cut-off line C, indicated as zone 1, that is to say the zone of the road scene which is lit by the headlight of the invention.

This zone is lit above the cut-off line by a beam which is additional to that from a standard main beam light. This additional beam is generally quite wide, its intensity being of a mean value with respect to an ordinary cruising beam (for example 5 to 30 lux, or 10 to 20 lux intensity, as compared to intensity of the order of 40 to 80 lux for a standard cruising beam), and it has a range which is for example of the order of 50 to 80 metres. It is conventionally designated by the term "complementary main beam" or "ambient main beam".

The person P2 who is situated in the zone of lighting extending to infinity is surrounded by a projected shadow OP which enables him to avoid being dazzled.

In general terms, in the invention, all the living beings who are situated within the road scene are detected, whether they are humans or animals. As will be seen later herein, this detection can for example be obtained by temperature difference, or by detecting movements. In general terms, the term "person" is used herein to mean every living being detectable according to the invention.

Figure 2:
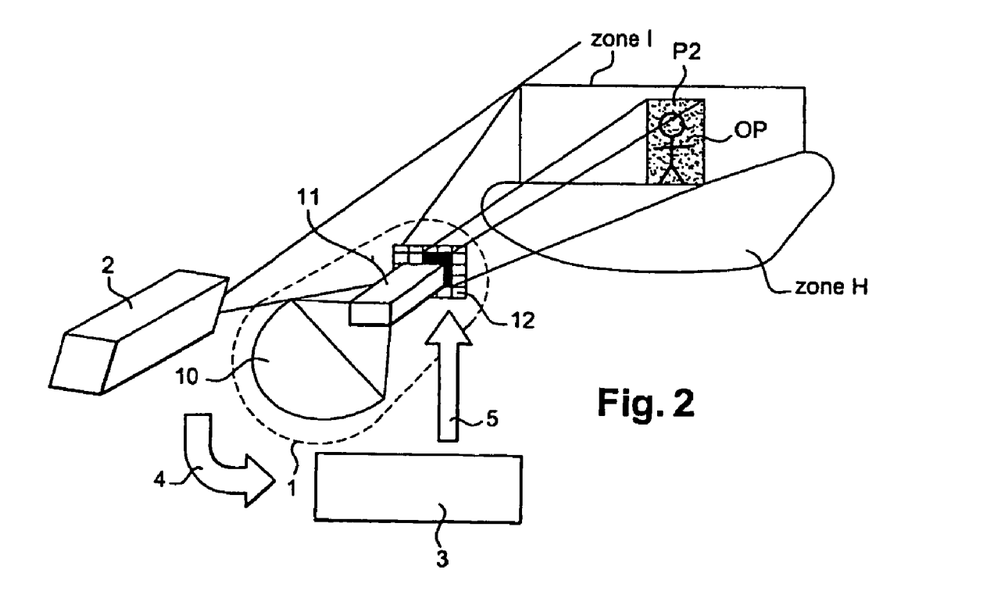
FIG. 2 shows the various elements constituting a headlight according to the invention, controlled by a camera.

FIG. 2 shows functionally the headlight of the invention with one example of illumination of the road scene. The example of road scene in FIG. 2 shows the person P2 with a projected shadow OP around him, in the lighting zone 1. The projected shadow OP is created by means of an optical system 1 associated with a person detection system 2 and an electronic image processing system 3. The optical system 1 and the electronic image processing system 3 together constitute a system for modulating the light emitted by a light source 10.

In accordance with the invention, the person detection system 2 may be a camera, for example a thermal camera, which takes images of the road scene situated in front of the vehicle. These images of the road scene, which are called natural images, are transferred to the electronic system 3 as indicated diagrammatically by the arrow 4, and the latter then carries out electronic processing of these images. This processing enables the position of the person P2 in the road scene to be pinpointed. As will be seen later herein, the image processing also enables a mask, or light trap, to be created on the imager 12 of the optical system 1. This mask is transmitted to the imager 12, as indicated diagrammatically by the arrow 5. When the light source 10 is emitting a light beam, this beam is directed towards the imager 12 by means of a light guide 11. The zones of the imager 12 which constitute the screen are opaque and do not allow light to pass through. On the other hand, the zones of the imager 12 which do not include the mask are transparent to light; the light beam emitted by the source 10 then passes through the imager and is projected outside the headlight, that is to say on the road scene. The mask which is produced on the imager 12 prevents the light beam from passing through, which generates a projected shadow OP about the person P2.

As described above, the method is carried out in real time.

FIG. 2 shows the electronic system 3 and the optical system 1 as being independent of each other. In practice, the electronic system 3 may be incorporated within the optical system 1, as will be understood from the description below.

Figure 3:
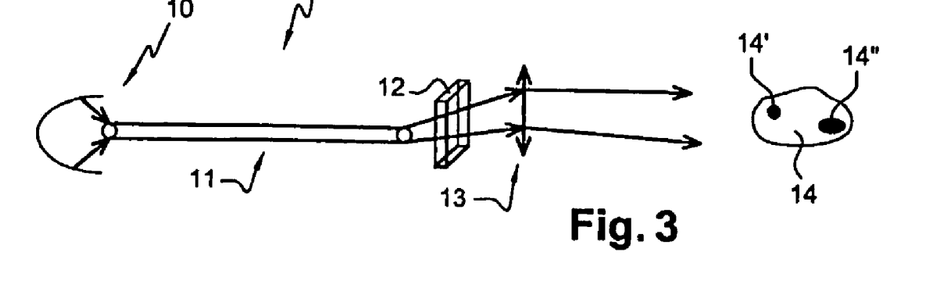
FIG. 3 shows a first embodiment of the optical system of the headlight of the invention.

FIG. 3 shows one embodiment of the optical system 1 for the headlight according to the invention. This optical system 1 comprises a light generator or light source 10. This light source 10 may for example be a discharge lamp or an elliptical source, such as a xenon lamp such as is conventionally found in current vehicles. The light source 10 is connected to the imager 12 through a light guide 11. The light guide may be an optical fibre of large cross section. The guide may also, as in the preferred embodiment of the invention, be a matrix of optical fibres carrying the light from the light source to the imager 12. The light guide may also be used for the purpose of reducing the quantity of infrared light issued by the light source, for the purpose of limiting heating of the imager. It may also be used for the purpose of making the light drawn from the light source uniform in front of the imager. The imager either does or does not pass light, according to whether the light beam reaches a zone of the imager that is with or without a screen. Once the light has passed through the imager 12, it is then transmitted through an optic 13 of the headlight towards the road to be lit. The optic 13 may be a light diffusing lens.

The form of the lighting zone I which is obtained depends in particular on the optic 13 which is chosen.

In FIG. 3, the light beam projected on the road is shown in a random form with the reference numeral 14. The references 14' and 14" represent two projected shadows which are obtained in the light projected on the road. In practice, these projected shadows 14' and 14" are seen by the driver as black patches. Thus, when the driver sees one or more black patches on the road scene in front of him, he knows that there are living beings there.

Figure 4:
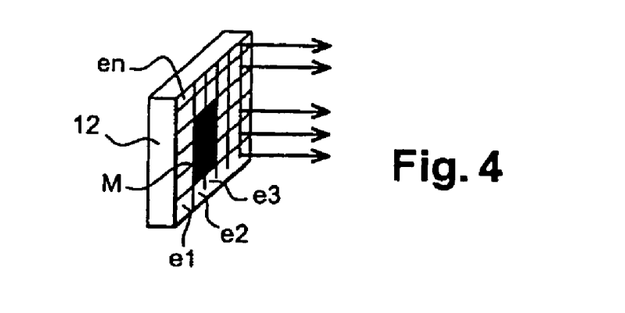
FIG. 4 shows an imager in the headlight of the invention.

FIG. 4 shows an imager 12 comprising a matrix of image elements of pixels. These image elements are given the reference numerals e1, e2, e3 . . . en.

In a preferred embodiment of the invention, the imager 12 is a liquid crystal imager, in which each crystal forms an image element.

In the imager of FIG. 4 one example of a mask is indicated at M. The image elements that constitute the mask are shown in black. These black image elements are occulting. They accordingly prevent light from passing through the imager 12. On the other hand, the image elements which do not constitute the mask M are shown in clear. They are transparent and allow light through. The resulting light beam, that is to say the light beam which is obtained as the output from the imager 12, therefore has zones without any light, which constitute a projected shadow around the person.

In the example shown in FIG. 4, the mask M is rectangular. In order to obtain such a mask of a particular form, for example rectangular, the mask initially calculated is put through a convolution by a convoluting element, which is for example rectangular. This convoluting element may of course have any other form, and may for example be oval. The convolution enables the form and/or dimensions of the mask to be modified, the object of which is to adjust the size of the projected shadow around the person.

The mask produced on the imager of FIG. 4 is created by the electronic system 3. The method of creating this mask is as follows: when the camera 2 detects a person P2 in the road scene situated in front of the vehicle, and in particular in the zone I above the cut-off line C, the image captured by the camera 2 is transmitted to the electronic system 3. The latter, using suitable image processing, pinpoints the position of the person P2 in the road scene, and also his dimensions. After the location of the person P2 is identified, the electronic system 3 generates a mask, still using image processing. The mask is passed to the imager 12 in inverse video with respect to the mask calculated by the electronic system. In this connection, in the image captured by the camera (in the case of a thermal camera), the zones detected (which correspond to a person) are white, whereas the undetected zones are black. The electronic system processes the natural image taken by the camera and obtains a final mask which consists of white elements. It therefore effects a video inversion of the mask obtained and transmits this mask "in inverse video" to the imager. In the imager, the mask is therefore composed of black elements, that is to say those opaque to light, the zone which does not form part of the mask consisting of white elements, that is to say those transparent to light.

More precisely, in the case in which the camera 2 is a thermal camera capable of detecting a living being, that is to say a 10 micron thermal camera, the camera detects heat sources which appear brighter on the image than the remainder of the image of the road scene. What is called a thermal image is thereby obtained. Subsequently, for this thermal image, a zone is selected for processing, that is to say the brightest zone of the image. This selection is determined as a function of a pre-defined brightness threshold value. Beyond this threshold value, it is considered that the matrix element of the camera corresponds to a hot zone and therefore to the presence of a person. Each micro-bolometric element of the camera matrix is thus given a threshold value for determining whether there is a hot zone or not in the camera. The hot zones correspond to a person, while the non-hot zones correspond to the absence of any living being.

In other words, the image processing performed by the electronic system 3 consists in selecting the zones of the thermal image beyond a certain temperature, that is to say a predetermined threshold value. An image over this value is therefore obtained which causes only the person in the road scene to appear. This image has two levels, that is to say a white level and a black level. The person preferably appears in a pure white level, while the rest of the image appears on a pure black level. This image is then transmitted in inverse video to the imager 12, and is applied on the imager. An inverted image, above the threshold value and comprising a screen formed by black image elements, is thereby obtained on the imager. This screen corresponds to the dimensions and location of the person in the road scene. Thus, by lighting the road with the light source 10 through the imager 12, only that part of the light beam that passes through the imager beyond the mask is projected on the road. The light beam on the road is thus modulated by the mask applied on the imager 12. A projected shadow is thus created around the person concerned.

A similar method may be used with a sensitive camera working in the visible waveband or the near-infrared waveband.

In another version of the invention, the electronic system 3 may refine the formation of the mask, for example, by looking for the contour of the person P2 before determining the image beyond the threshold.

In a further version, already described, the mask may be subjected to convolution with a suitable convoluting element which enables the size and form of the mask to be modified.

The electronic system 3 just described may for example be an integrated circuit or a DSP (digital signal processor). It may then be incorporated very easily into the optical system 1 of the headlight of the invention.

Figure 5:
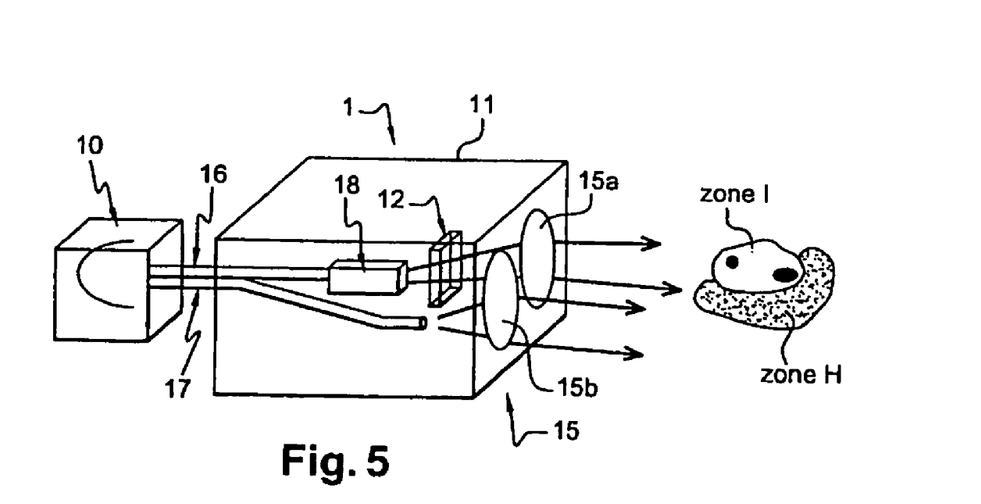
FIG. 5 shows a second embodiment of the optical system of the headlight of the invention.

FIG. 5 shows a second embodiment of the optical system of the headlight of the invention. Those elements of this optical system which are identical to those of the optical system of FIG. 3 carry the same references.

In this embodiment, the optical system 1 comprises a light source 10 and an imager 12, which are joined together through a light guide 11 having two light paths 16 and 17. These two light paths may be two matrices of optical fibres, or two optical fibres of large cross section. The first optical fibre matrix 16 is adapted to guide the light from the light source to the imager 12. That part of the light beam which has passed through the imager 12 is then broadcast outside the headlight through an output optic 15a, which may for example be a diffusing lens similar to the lens 13 in FIG. 3.

The second optical fibre matrix 17 is adapted to lead the light from the light source 10 directly to an output optic of the headlight, which has the reference numeral 15b. This optic 15b may be identical to the optic 15a.

This version, having two light guides, has an advantage in energy terms, because it enables a dipped beam to be generated with a maximum amount of energy without passing through the imager which, in the passing state, has a transmission of about 80%. It is only the 20%, approximately, of the light beam which is to form the zone I and is liable to dazzle the target person that is controlled by the modulator, that is to say transmitted through the imager.

Thus, in this embodiment, the headlight is able to generate, at the same time, a cruising beam illuminating the zone H and a supplementary beam which illuminates the zone I and which is produced by the method of the invention. The optical system then enables illumination of the zone H with a main beam to be achieved at the same time as lighting of the zone I to infinity, with a common light source 10. In another embodiment of the invention, the light source 10 may be adapted by itself to constitute the zone I of lighting to infinity. In that case, the conventional lighting of the vehicle can be used to form the main beam lighting zone H. The headlight of the invention which lights the zone I can then be placed within the vehicle headlight itself; the main beam headlight of the vehicle then has two light sources, one of which projects light directly to the output optic, while the other projects light through the imager. The headlight of the invention can also be mounted in a different place from the vehicle headlight within the radiator grille of the vehicle. A motor vehicle could thus have three headlights for example, namely two conventional main beam driving lights (also referred to as main headlights), and a headlight according to the invention which is located for example in the middle of the front of the vehicle.

In the case of FIG. 5 as in the case of FIG. 3, the electronic system 3 is arranged upstream of the imager 12, so as to create a mask to be applied on the imager 12, the light emitted by the light source 10 being projected outside the headlight as explained above.

In the embodiment of FIG. 5, the light beam is transmitted through optical fibres from the light source 10 to the imager 12 through a block or bar 18 of quartz or glass, the purpose of which is to make the light beam homogeneous and to reduce its infrared radiation. In other words, this quartz or glass block or bar 18 prevents the imager 12 from receiving excessive energy which would be detrimental to the way it works.

Such a quartz or glass block or bar 18 may also be inserted between the optical fibre matrix 11 and the imager 12, in the optical system of FIG. 3.

It should also be noted that the use of a discharge lamp as the light source 10 enables problems due to excessive temperature on the imager to be avoided, since a discharge lamp is a cold source. Moreover, transport of the light through optical fibres also enables any heat to be diminished in the light emitted by the light source 10.

In the embodiment of FIG. 5, the greater part of the optical system 1 is incorporated in a headlight housing 15. This housing may then be located outside the headlight, which enables a headlight of reduced size and without any thermal stress to be obtained. The optical connections 11 must in this case be longer. This separation of the light source 10 can also be made in the embodiment of FIG. 3. In parallel, in the embodiment of FIG. 5, the light source 10 may be incorporated in the housing 15 with the optical system 1.

In the whole of the foregoing description, the means for detecting a person is described as being a thermal camera. This detection means may also be an infrared camera associated with a movement detector. In that case, the camera ensures capture of the image of a road scene and the electronic system 3 detects and pinpoints the position of persons by detecting movement. In another version of the invention, thermal detection may be coupled with movement detection in order to make detection of living beings more secure.

In a further embodiment of the invention, it is arranged that the optical fibres are displaced vertically by a small distance in the focal plane of the optic 13, so as to modulate the light and thereby form light beams which are compatible with the "adverse weather lighting" or "motorway lighting" functions, that is to say the functions of lighting in rain or lighting on motorways.

Figure 6:
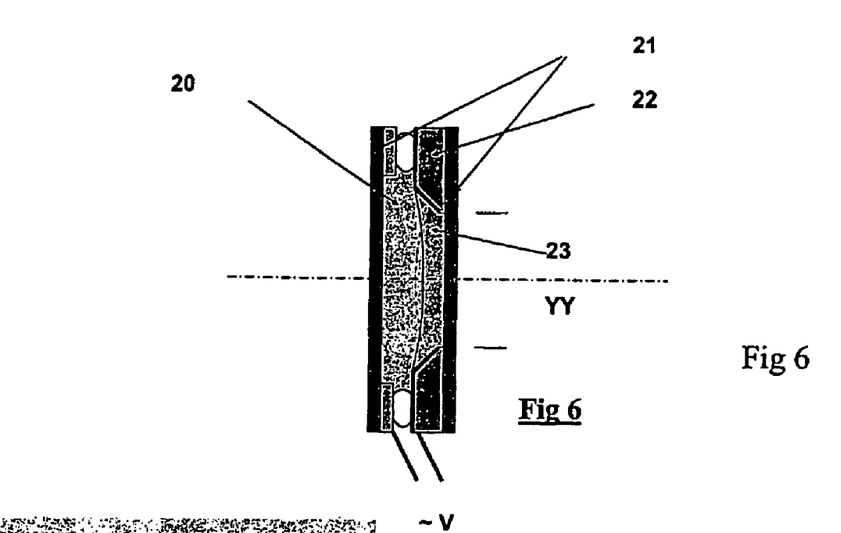
FIGS. 6 to 9 illustrate a third embodiment of the invention, which makes use of an imager which employs lenses, the focal length of which is adjustable by electrical control.
Figure 7:
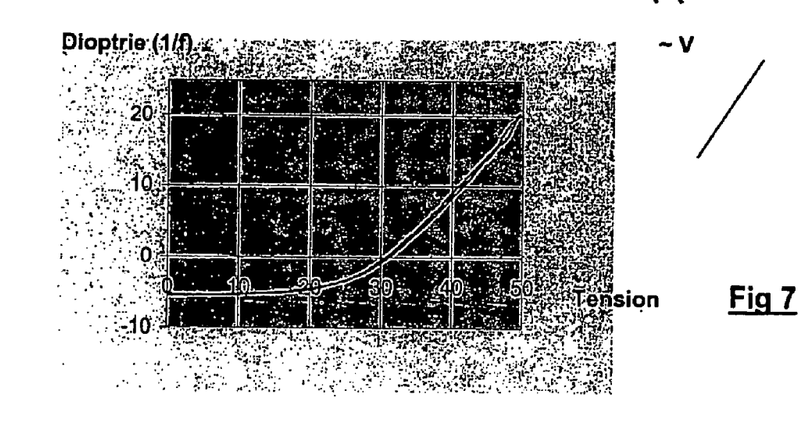
Figure 8:
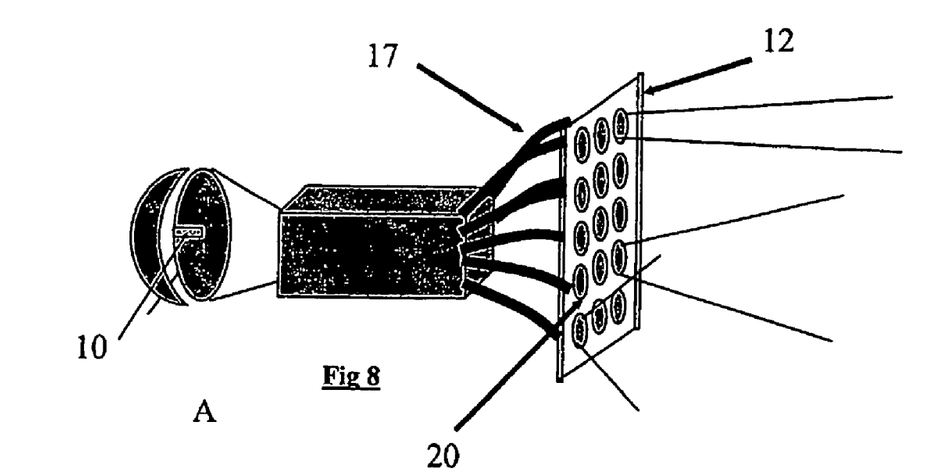
Figure 9:
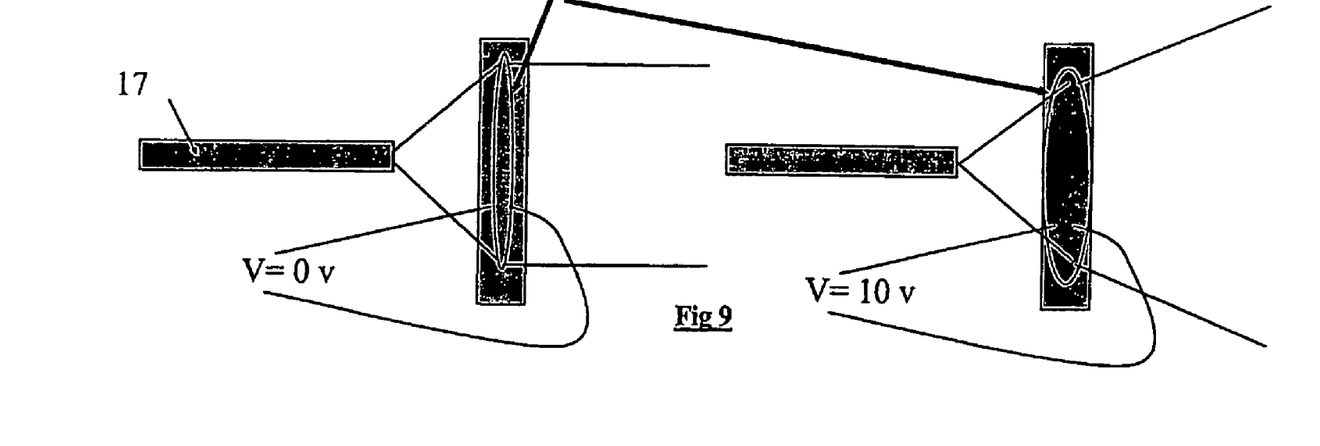

FIGS. 6 to 9 illustrate a further version of the invention, which makes use of an imager 12 consisting of a matrix of lenses, the focal length of which is electrically controllable. Its principle is as follows: as shown in FIG. 6, a lens is formed by placing between two walls 21, of glass or transparent plastics material, a liquid conductor 20 (water) and a drop of a liquid 23 which is non-miscible with water (an oil). YY represents the optical axis, and a support 22 is provided. Under the effect of an electric field which is applied in an appropriate way, the drop of oil has a variable profile, because it moistens in a differing way the wall on which it has been deposited, and this modifies the focal length of the lens which itself consists of this oil drop. Two possible profiles are shown respectively by a continuous line and a broken line. FIG. 7 shows the variation in lens power (in dioptres) of the lens as a function of the applied voltage: the amplitude of variation is very high. FIGS. 8 and 9 represent the whole of the optical system in a similar way to FIG. 5 and with the same references: an optical fibre system 17 is used in association with the imager 12, using a matrix of lenses the same as in FIG. 6. FIG. 9 shows how one of the lenses changes shape according to whether the voltage applied to it is 0 or 10 volts.

The method according to the invention which has just been described enables main beam lighting to be obtained which is superior to the usual lighting situated above the cut-off line, while ensuring that this additional lighting will not dazzle any living beings who happen to be in the field of illumination. This supplementary lighting obtained in the zone I enables the driver to see the road scene beyond the cut-off line C. The black patches which can be seen by the driver in this additional lighting warn him of the presence of living beings in the road scene. The method of the invention thus enables any obstacles for the driver to be detected.

Whatever embodiment is adopted, the headlight of the invention ensures improved perception and improved visibility of the road by the driver. In this connection, this headlight permits conventional lighting of the road scene and also more remote illumination beyond the cut-off line. Even if this more remote illumination includes black patches, and even if these black patches are numerous, for example in the case of a group of people to one side of the road, the driver does of necessity have better visibility than with conventional lighting, because this more remote lighting is additional lighting.

What is claimed is:

1. A method of lighting a road scene with a vehicle headlight comprising:

detecting in a road scene at least one living being;

pinpointing dimensions and location of the at least one living being detected in the road scene;

creating, on an imager, at least one mask having dimensions and a position corresponding to the dimensions and location of the at least one living being detected in the road scene;

illuminating the road scene through the imager; and projecting at least one shadow around the at least one living being when the at least one living being is detected in the road scene.

2. The method of lighting according to claim 1, which illuminates a zone of the road scene situated above a cut-off line.

3. The method of lighting according to claim 1, wherein said detecting comprises taking an image of the road scene with a thermal detection of the at least one living being.

4. The method of lighting according to claim 1, wherein said detecting comprises taking an image of the road scene with a detection of movement of the at least one living being.

5. The method of lighting according to claim 1, wherein said pinpointing and creating are obtained by image processing.

6. The method of lighting according to claim 1, wherein pinpointing includes applying a threshold-value technique to the image of the road scene.

7. The method of lighting according to claim 6, wherein applying the threshold-value comprises forming an image at two levels, black and white, of the image of the road scene.

8. The method of lighting according to claim 7, wherein said creating comprises applying, in inverse video on the imager, the image which the threshold-value has been applied.

9. The method of lighting according to claim 6, wherein said creating includes convoluting the image to which the threshold-value has been applied.

10. The method of lighting according to claim 1, wherein said creating is performed in real time.

11. A main beam headlight for a vehicle comprising:

a first light source and a system for modulating light emitted by said first light source, wherein said system for modulating comprises:

at least one light guide for transporting light emitted by said first light source to an imager, said at least one light guide having a cross section and comprising at least one matrix of optical fibers or an optical fiber having said cross section; and an electronic system comprising a means for detecting a road scene and a means for generating masks on said imager to block passage of light transported by said at least one light guide through said imager in response to a detected image of a road scene.

12. The headlight according to claim 11, wherein said imager comprises a matrix of liquid crystal systems which are electronically controllable, or a matrix of lenses having a focal length for modulation by electrical control.

13. The headlight according to claim 11, wherein said at least one light guide comprises a first light path for guiding light towards the imager, and a second light path for guiding light towards an optic for diffusing the light.

14. The headlight according to claim 11, including a second light source, independent of said first light source, for providing a main beam or cruising illumination.

15. The headlight according to claim 11, wherein said electronic system is controlled by a detection means for detecting at least one living being in the road scene.

16. The headlight according to claim 15, wherein said detection means comprises a thermal camera.

17. The headlight according to claim 15, wherein said detection means comprises an infrared camera.

18. The headlight according to claim 11, wherein said at least one light guide includes, upstream of the imager, a means for making light distribution in said imager homogeneous.

19. The headlight according to claim 18, wherein said means for making light distribution in said imager homogeneous comprises a block or bar of quartz or glass.

20. The headlight according to claim 11, including a lens for diffusing light downstream of said imager.

21. The headlight according to claim 11, wherein said first light source is located in a housing outside said modulating system.

* * * * *